United States Patent [19]

Kashiwase et al.

[11] 4,371,656

[45] Feb. 1, 1983

[54] METAL SUBSTITUTED ZEOLITES AS STABILIZERS FOR HALOGEN-CONTAINING RESINS

[75] Inventors: Kohji Kashiwase, Funabashi; Yasuo Machino, Ichikawa; Muneo Mita, Chiba; Tsunenosuke Hiramatsu, Hatogaya; Toshihiko Morishita, Tokyo; Mitsuo Taniguchi, Funabashi, all of Japan

[73] Assignees: Nippon Chemical Industrial Co., Ltd.; Kosei Co., Ltd., both of Tokyo, Japan

[21] Appl. No.: 214,165

[22] Filed: Dec. 8, 1980

[30] Foreign Application Priority Data

Jul. 23, 1980 [JP] Japan .................................. 55-99835

[51] Int. Cl.$^3$ .......................... C08K 3/34; C09K 15/02
[52] U.S. Cl. ................................... 524/443; 252/397; 252/400 R; 252/407; 524/109; 524/178; 524/317; 524/388; 524/399; 524/434; 524/450
[58] Field of Search ................ 260/45.7 R, 45.75 W; 252/400 R, 397; 524/443, 450

[56] References Cited

U.S. PATENT DOCUMENTS

| | | | |
|---|---|---|---|
| 2,867,605 | 1/1959 | Safford | 260/45.75 W |
| 3,245,946 | 4/1966 | O'Connor et al. | 260/42.34 |
| 3,730,943 | 5/1973 | Weisfeld et al. | 260/45.75 W |
| 4,000,100 | 12/1976 | Baldyga | 260/23 XA |
| 4,060,508 | 11/1977 | Sugahara et al. | 260/45.75 W |
| 4,307,010 | 12/1981 | Sandler et al. | 260/45.75 W |

*Primary Examiner*—Lorenzo B. Hayes
*Assistant Examiner*—R. A. White
*Attorney, Agent, or Firm*—Sughrue, Mion, Zinn, Macpeak & Seas

[57] ABSTRACT

A stabilizer for use in a halogen-containing resin is described comprising a crystalline aluminosilicate substituted with ions of a metallic element belonging to Group II or Group IVA of the Periodic Table for Group I (M) metal ion contained in said aluminosilicate and containing 10% by weight of less, as $M_2O$, of residual Group I metal ions.

17 Claims, No Drawings

4,371,656

METAL SUBSTITUTED ZEOLITES AS STABILIZERS FOR HALOGEN-CONTAINING RESINS

BACKGROUND OF THE INVENTION

This invention relates to a stabilizer for use in a halogen-containing resin, and more particularly to a stabilizer for a halogen-containing resin which is of substantially reduced toxicity and has excellent heat stabilization properties.

In general, a halogen-containing synthetic resin, when heat-molded, is easily subject to heat-decomposition, mainly resulting from dehydrohalogenation, or, when practically used, it similarly tends to decompose by exposure to sunlight. As a result, it gradually becomes discolored, e.g., yellowish orange, pink, and/or brown, and at the same time its physical properties and durability deteriorate. In order to inhibit such deterioration, therefore, particularly in heat mold processing, a number of stabilizers have been proposed and used. Typical examples are a lead-based stabilizer, a metal soap-based stabilizer, an organic tin-based stabilizer, etc.

These stabilizers provide satisfactory heat resistance, but they often suffer from disadvantages in that halogen-containing synthetic resins containing such stabilizers are inferior in sulfide resistance, lack transparency, are somewhat toxic and are expensive. In many cases, therefore, they are used in combination with each other to partially compensate for their disadvantages. Recently, in particular, mold processing has often been carried out at a high temperature range and therefore it has increasingly been desired to develop or discover those stabilizers which provide heat stability at such high temperature molding and at the same time which are of as low toxicity as possible at the time of operation and use thereof.

In view of the circumstances described above, various inorganic stabilizers have been proposed, and zeolite is known as an inorganic stabilizer. For example, U.S. Pat. No. 3,245,946 discloses a molecular sieve zeolite A which is activated by dehydration at a temperature of at least 300° C.; U.S. Pat. No. 4,000,100 discloses use of an inactive zeolite having a water content of from 18 to 25% in combination with another stabilizer; and Japanese Patent Application (OPI) No. 34356/79 (The term "OPI" as used herein refers to a "published unexamined Japanese patent application") discloses the use of an aluminosilicate of zeolite crystal having an ion (sodium salt) exchange capacity of 2.1 m.eq./g.

In all the patents as described above, sodium zeolite A containing $Na^\oplus$ in the crystal structure is mainly used. Although substituted zeolite such as calcium zeolite A is suggested to have an effect similar to that of sodium zeolite A, no concrete examples are disclosed.

However, the inventors' extensive experiments on the heat stabilization ability of zeolite on the halogen-containing resin, particularly a vinyl chloride resin, have revealed that when the sodium zeolite is used, coloration showing a reddish tint characteristic of sodium occurs from the beginning of heating, and thus it is not practical to use sodium zeolite as a stabilizer. As a result of further investigations, it has been found that by ion-exchange of the sodium with zinc, zeolites can be obtained an excellent heat stabilization ability and provide excellent weather resistance and moldability (Japanese Patent Application No. 70649/79, filed June 7, 1979).

These metal substituted zeolites, however, still have disadvantages. For example, their effects greatly vary when they are incorporated in the halogen-containing synthetic resin and, in particular, a great difference in the weather resistance of the resin occurs.

SUMMARY OF THE INVENTION

An object of this invention is to provide an improved zeolite inorganic stabilizer which has low toxicity.

Another object of this invention is to provide an excellent composite stabilizer comprising a zeolite inorganic stabilizer and a lead-based stabilizer or an organic tin-based stabilizer wherein the disadvantages of the components are substantially compensated for by each other.

It has now been found that the performance of the stabilizer is dependent mainly on the amounts of the substitution metal and residual sodium present in the stabilizer, and on this basis the present invention has been made. This invention, therefore, relates to a stabilizer for a halogen-containing resin which comprises a crystalline aluminosilicate substituted with ions of a metallic element of Group II or Group IVA of the Periodic Table for Group I (M) metal ions, typically $Na^\oplus$, contained in the aluminosilicate and containing 10% by weight or less, as $M_2O$, of the residual Group I metal ion.

This invention also relates to a stabilized halogen-containing resin composition comprising a halogen-containing resin and a stabilizer which is a crystalline aluminosilicate substituted with ions of a metallic element belonging to Group II or Group IVA of the Periodic Table for Group I (M) metal ions contained in the alumino-silicate and containing 10% by weight or less, as $M_2O$, of the residual Group I metal ion.

DETAILED DESCRIPTION OF THE INVENTION

The aluminosilicate which can be used in this invention has the so-called zeolite crystal structure, and contains exchangable cations. The crystal structure can easily be confirmed by X-ray diffraction analysis, and substantially amorphous aluminosilicates are not suitable for use in this invention.

Crystalline aluminosilicates which can be used in this invention are represented by the formula $(1 \pm 0.2)M_2O \cdot Al_2O_3 \cdot (1 \sim 10)SiO_2 \cdot (1 \sim 10)H_2O$ (wherein M is a Group I metal ion) and include zeolite A, zeolite X, zeolite Y, zeolite P, mordenite, analcite, sodalite group aluminosilicate, clinoptilolite, erionite, chabazite, etc. They may be either synthetic or natural. When they are synthetic, the process of production is not critical. Of these aluminosilicates, zeolite A and sodalite group aluminosilicate are particularly preferred from a standpoint of performance and industrial usefulness.

In the above aluminosilicates, the cation is usually sodium and in some cases, potassium or the like, i.e., metal ions of Group I of the Periodic Table. The zeolite used as a stabilizer in this invention should be a metal-substituted aluminosilicate wherein the cation is ion-exchanged with other metal ions.

The other metals used in the ion-exchange are those belonging to Groups II (including both Groups IIA and IIB) or IVA of the Periodic Table, including combinations thereof. Examples of the metals of Group II are magnesium, calcium, strontium, barium, zinc and cadmium, and examples of the metals of Group IVA are lead and tin. Of such metal-substituted zeolites, calcium- , magnesium- and zinc-substituted zeolites are particularly suitable.

The metal-substituted zeolite can easily be prepared, for example, by bringing a zeolite, such as sodium zeolite A, into intimate contact with an aqueous solution of a soluble salt of the other metal to be used in the ion-exchange.

The Group II or IVA metal salt can be added in the form of a chloride, a nitrate, a sulfate, an organic acid salt, or the like. Therefore, for the ion-exchanging, the batch process in which the zeolite is soaked in the metal salt aqueous solution, the column process in which the metal salt aqueous solution is passed through a zeolite solid layer, the process in which the above two processes are combined together, etc., can be employed. By replacing the cations contained of in the zeolite by other cations in the aqueous solution and then washing with water, the Group II or IVA metal-substituted zeolite is obtained.

Of the metal-substituted zeolites of this invention, calcium-substituted zeolite A and zinc-substituted zeolite A are particularly preferred. They may be used individually or in combination.

The stabilizer of this invention contains as an effective component the metal-substituted zeolite as described above. The amount of residual Group I (M) metal ion in the zeolite should be about 10% by weight or less, as $M_2O$ (i.e., expressed as if the M was all present in the form of $M_2O$). As the amount is lower, it is more preferred, and it is particularly preferred that the amount is about 5% by weight or less, as $M_2O$.

Although it is considered that sodium is excellent from a viewpoint of its hydrogen chloride-capturing ability (because of its high basicity), when a sodium salt is incorporated into a vinyl chloride resin, the resin is colored red at the beginning of the heat-molding and its weather resistance is markedly deteriorated. The reason for this is not clear, but it is assumed that when the resin is heat-molded or the molded resin is exposed to light, the sodium releases hydrogen chloride from the vinyl chloride resin because of its high basicity, thus accelerating the deterioration of the resin. Therefore, where a sodium salt, such as sodium stearate, etc., is added to the vinyl chloride resin for a specific purpose, the upper limit of amount of addition is from about 0.1 to 0.2 parts by weight per hundred parts by weight of the resin (hereafter referred to as "phr"), and in greater amounts than the upper limit, the defects as described above become significant.

Japanese Patent Application (OPI) No. 34356/79 as described hereinbefore describes that the sodium in the zeolite crystal structure effectively exhibits its hydrogen chloride capturing ability, differently from other sodium salts, and is excellent as a stabilizer. However, the inventors' experiments have revealed that the sodium ion held in the zeolite crystal structure is not exceptional and when the vinyl chloride resin with the sodium ion-containing zeolite compounded thereto is exposed to air, it is greatly deteriorated, becomes colored red, and is adversely affected in its weather resistance.

The stabilization ability of the metal-substituted zeolite to the halogen-containing resin markedly varies depending upon the type of the cation and the relation between the amount of substituted metal ion and the residual sodium ion. In particular, the initial coloration at the time of resin molding and the weather resistance are greatly influenced by the residual sodium ion content.

Therefore, when the residual sodium ion content is 10% by weight or less, as $Na_2O$, the stabilizer of this invention is substantially free from the problems described above, and can be preferably used although it varies depending upon the amount of the stabilizer used and the conditions under which the stabilizer is used. Since the stabilizer is prepared by the method as described above, even though the substitution ratio is high, some sodium ion remains, inevitably, in a small amount. However, when the amount of the residual sodium ion is 5% by weight or less, no influences resulting from the residual sodium ion are observed. For example, even when the stabilizer is compounded to the vinyl chloride resin in an amount of 1 to 2 phr, it can effectively be used.

The amount of the residual Group I metal ion as used in this invention is determined by the use of an atomic absorption spectrophotometer.

In the stabilizer of this invention, the metal-substituted zeolite usually contains water of crystallization, but the presence of the water of crystallization exerts no influences on the stabilization ability. However, depending upon the embodiment in which the resin is molded and the combination of the metal-substituted zeolite and other additives, there is a possibility of the water being evaporated during the molding, resulting in the foaming of the resin. Therefore, where there is such a possibility, it is desirable that dehydrated particles having a low water content be used. That is, it is sufficient to reduce the water content to such an extent that substantially no water evaporation occurs at the molding temperature of the halogen-containing resin composition.

The water content is about 8% by weight or less, and preferably 5% by weight or less. In many cases, by heating at a temperature of from 150° C. to 800° C., and preferably at from 200° C. to 700° C. for 1 hour, the metal-substituted zeolite having the above-described water content can be obtained.

Furthermore, in order to prevent moisture reabsorption of the zeolite and to make effective the dehydrated zeolite, it is preferred to cover the surface or voids of the particle with an organic substance. For such covering, no special organic substance is required, and it is sufficient to use at least one organic additive capable of constituting the halogen-containing resin composition. Examples of such additives include a plasticizer, a stabilizer, a chelating agent, an antioxidant, a lubricant and a thermoplastic resin.

These organic additives preferably have a boiling point higher than the molding temperature of the halogen-containing resin and a melting point lower than the molding temperature.

The covering with the organic additive can be carried out by mixing predetermined amounts of the dehydrated product and the organic additive and heat-melting the mixture, or by merely kneading the mixture when the organic additive is liquid.

The stabilizer of this invention substantially comprises the zeolite inorganic compound as described above and can be used as it is as an effective stabilizer. Depending upon the application and type of the resin and the type of the stabilizer, the stabilizer may function more effectively when it is used in combination with other stabilizers. For example, it is suitable to use it in combination with the lead-based stabilizer or organic tin-based stabilizer.

In this case, a calcium-substituted zeolite A is preferably used as a stabilizer of this invention. Of the above-described known stabilizers, the lead-based stabilizers have toxicity and the organic tin-based stabilizers have disadvantages in both workability and durability. However, when they are used in combination with the above-described zeolite, the disadvantages are markedly improved and the resulting stabilizer is preferably used as a stabilizer for the resin. In particular, the initial coloration upon the molding of the resin, the plate-out, etc., are materially inhibited and a preferred molded resin is obtained.

As the zeolite for use in producing the stabilizer in combination with the other stabilizers, the dehydrated zeolite can, of course, be used. In this case, those composited particles prepared by adding the above-described organic additive to a mixture of the dehydrated zeolite and the lead-based stabilizer and processing the resulting mixture in the manner as described above are preferably used. As the organic tin-based stabilizer, those prepared by soaking the dehydrated zeolite in the stabilizer which is liquid and then covering the surface thereof with a lubricant or other organic additives are preferably used.

Typical examples of such lead-based stabilizers include lead silicate, basic lead sulfate, lead stearate, dibasic lead stearate, etc.

Examples of organic tin-based stabilizers are as follows:

Methylstannonic acid, butylstannonic acid, octylstannonic acid, dimethyltin oxide, dibutyltin oxide, dioctyltin oxide, dimethyltin sulfide, dibutyltin sulfide, dioctyltin sulfide, dicyclohexyltin sulfide, monobutyltin oxide sulfide, methylthiostannonic acid, butylthiostannonic acid, octylthiostannonic acid, dibutyltin laurate, dibutyltin stearate, dioctyltin diolate, dibutyltin basic laurate, dibutyltin dicrotonate, dibutyltin bis(butyoxydiethylene glycol maleate), dibutyltin dimethacrylate, dibutyltin dicinnanate, dioctyltin bis(oleylmaleate), dibutyltin bis(stearylmaleate), dibutyltin itaconate, dioctyltin maleate, diamyltin bis(cyclohexylmaleate), dimethyltin dicrotonate, diethyltin bis(isooctylcitraconate), dipropyltin bis(benzylmaleate), diisobutyltin bis(-propylmaleate), dicyclohexyltin maleate, dioctyltin bis(butylmaleate), dibutyltin dimethoxyde, dibutyltin dilauroxide, dioctyltin ethyleneglycoxide, a pentaerythritoldibutyltin oxide condensate, dibutyltin bis(laurylmercaptide), dimethyltin bis(stearylmercaptide), monobutyltin tris(laurylmercaptide), dibutyltin-β-mercaptopropionate, dioctyltin-β-mercaptopropionate, dibutyltin mercaptoacetate, monobutyltin tris(isooctylmercaptoacetate), monooctyltin tris(2-ethylhexylmercaptoacetate), dibutyltin bis(isooctylmercaptoacetate), dioctyltin bis-(isooctylmercaptoacetate), dioctyltin bis(2-ethylhexylmercaptoacetate), dimethyltin bis-(isooctylmercaptoacetate), dimethyltin bis(isooctylmercaptopropionate), monobutyltin tris(isooctylmercaptopropionate), bis[monobutyldi(isooctoxycarbonylmethylenethio)tin]sulfide, bis[dibutylmono(isooctoxycarbonylmethylenethio)tin]sulfide, monobutylmonochlorotin bis(isooctylmercaptopropionate), monobutylmonochlorotin bis(isooctylmercaptoacetate), monobutylmonochlorotin bis(laurylmercaptide), dibutyltin bis-(ethylcellosolvemaleate), bis(dioctyltin laurate)maleate, bis-(dioctyltin butylmaleate)maleate, etc.

Furthermore, when the stabilizer of this invention is used in combination with an epoxy compound, a polyvalent alcohol, or its partial ester, or the like, the effect of the stabilizer is more effectively obtained.

Examples of such epoxy compounds include epoxidized unsaturated oils such as an epoxidized soybean oil, an epoxidized linseed oil, an epoxidized linseed oil aliphatic acid butyl ester, an epoxybutyl stearate, etc., epoxidized unsaturated aliphatic acid esters, epoxycyclohexane derivatives, epichlorohydrin derivatives, etc.

Examples of polyvalent alcohols include, 1,1,1-trimethylolpropane, 1,1,1-trimethylolethane, erythritol, pentaerythritol, 1,2,3,4-pentatetorol, 1,3,4,5-hexanetetorol, dipentaerythritol, xylitol adonitol, sorbitol, mannitol, heptitol, octitol, propylene glycol, triethylene glycol, glycerin, polyethylene glycol, polypropylene glycol, or their ethyleneoxide adducts, glucose, fructose, galactose, saccharose, maltose, lactose, etc.

Examples of partial esters of polyvalent alcohols are glycerin aliphatic acid monoester, 1,3-butanediol montanic acid monoester, polyethylene glycol monoaliphatic acid ester, and the like.

When the stabilizer of this invention is used in combination with an organic straight-chained compound selected from an alcohol, an aldehyde, a carboxylic acid, a ketone, an ester, and an ether, all containing up to 10 of carbon atoms, the transparency of the resin tends to markedly increase. These organic compounds include straight-chained carboxylic acids containing 4 or less of carbon atoms such as propionic acid, butyric acid, acrylic acid, etc.; straight-chained ketones containing 6 or less carbon atoms and polyformaldehydes, such as 1,2-dimethoxyethane, acetylacetone, epichlorohydrin, etc.; straight-chained esters containing 6 or less carbon atoms, such as acetoacetic acid methyl ester, etc.; straight-chained monovalent alcohols containing 5 or less carbon atoms, such as methylalcohol, ethylalcohol, n-propylalcohol, n-butylalcohol, allylalcohol, etc.; and straight-chained polyvalent alcohols and their derivatives, such as ethylene glycol, diethylene glycol, glycerin, ethylene glycol monoethyl ether, ethylene glycol dimethyl ether, ethylene glycol monoacrylate, diethylene glycol monomethyl ether, diethylene glycol monoethyl ether, diethylene glycol mono-n-butyl ether, glycerin monomethyl ether, glycerin monoethyl ether, glycerin monoacetate, cis-2-butene-1,4-diol, 1,3-butanediol, 2,2'-thiodiethanol, etc.

Of these organic compounds, ethylene glycol, diethylene glycol, glycerin and their ethers are particularly suitable. The amount of the organic compound added is desirably from about 0.05 to 2.0 parts by weight per 100 parts by weight of the halogen-containing resin.

Halogen-containing resins that can be used in this invention include:

Halogen-containing synthetic resins such as polyvinyl chloride, polyvinyl bromide, polyvinyl fluoride, polyvinyliden chloride, chlorinated polyethylene, chlorinated polypropylene, brominated polyethylene, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrenemaleic anhydride terpolymer, a vinyl chloride-styreneacrylonitrile copolymer, a vinyl chloride-butadiene copolymer, a vinyl chloride-isopropylene copolymer, a vinyl chloride-chlorinated propylene copolymer, a vinyl chloride-vinylidene chloride-vinyl acetate terpolymer, a vinyl chloride-acrylate copolymer, a vinyl chloride-maleate copolymer, a vinyl chloride-methacrylate copolymer, a vinyl chloride-acrylonitrile copolymer, internally plasticized polyvinyl chloride, etc.; and blends of such halogen-containing synthetic resins and homo- and copolymers of α-olefins, e.g., polyethylene, polypropylene, polybutene, poly-3-methylbutene, etc., and an ethylene-vinyl acetate copolymer, an ethylene-propylene copolymer, etc., polystyrene, an acryl resin, copolymers of styrene and other monomers (e.g., maleic anhydride, butadiene, acrylonitrile, etc.), an acrylonitrile-butadiene-styrene copolymer, an acrylate-butadiene-styrene copolymer, a methacrylate-butadiene-styrene copolymer and the like.

Of these halogen-containing resins, the vinyl chloride resin is most generally used.

Although the amount of the stabilizer of this invention being added varies depending upon the particular physical properties of the zeolite, the type of the halogen-containing resin, and the application of the resin composition, it is usually from about 0.2 to 10 parts by weight per 100 parts by weight of the halogen-containing resin, with the range of from 1 to 5 parts by weight per 100 parts by weight of the halogen-containing resin being preferred. When the amount of the stabilizer added is less than about 0.2 part by weight, the effect of improving the heat resistance is insufficient. On the other hand, if the stabilizer is added in greater amounts than about 10 parts by weight, no further increase in the effect is obtained and the workability and transparency tend to deteriorate.

In preparing the halogen-containing resin composition using the stabilizer of this invention, a phthalic acid ester-based plasticizer, a polyester-based plasticizer, a phosphoric acid ester-based plasticizer, an epoxy plasticizer and other plasticizers can be used depending upon the application thereof. Furthermore, antioxidants such as a phenol-based antioxidant and a sulfur-containing compound, and ultraviolet ray absorbing agents such as benzophenone-based, benzotriazole-based, salicylate-based, substituted acrylonitrile-based, triazine-based, metal chelate-based ultraviolet ray absorbing agents can be used from a standpoint of increasing the light durability.

Additionally, if necessary, a pigment, a filler, a foaming agent, an antistatic agent, an anti-fogging agent, a plate-out inhibiting agent, a surface finishing agent, a lubricant, a flame retardant, a fluorescent agent, an antiseptic, a metal inactivation agent, a light deterioration agent, a non-metal stabilizer, a boric acid ester, a thiourea derivative, an auxiliary working agent, a mold-releasing agent, a reinforcing agent, etc., can be incorporated.

The following examples are provided to illustrate this invention in greater detail.

EXAMPLES 1-4 AND COMPARATIVE EXAMPLES 1-6

In these examples, calcium-substituted zeolite A stabilizers having different residual sodium contents were prepared and examined in their performances as stabilizers for halogen-containing resin. The preparation method and residual sodium content of each sample are indicated in Table 1.

TABLE 1

| Sample No. | Type | Preparation Method | Na$_2$O (%) |
|---|---|---|---|
| 1-1 | Sodium-zeolite A | An aqueous solution of sodium aluminate and an aqueous solution of sodium silicate were reacted in the presence of sodium hydroxide, and the reaction product was crystallized, filtered off, washed with water and dried. | 17.0 |
| 1-2 | Calcium-substituted zeolite A | 1 l of a 1.5% CaCl$_2$ aqueous solution was added to 100 g of sodium zeolite A crystal powder (Sample 1-1), and the mixture was stirred at room temperature for 5 hours, filtered off, washed with water, and then dried at 120° C. for 2 hours. | 12.3 |
| 1-3 | Calcium-substituted zeolite A | In the same manner as in the preparation of Sample 1-2 except that a 3% CaCl$_2$ aqueous solution was used in place of a 1.5% CaCl$_2$ aqueous solution, a crystal powder was obtained. | 8.2 |
| 1-4 | Calcium-substituted zeolite A | A crystal powder was obtained by repeating twice the same procedure as in preparation of Sample 1-3 (i.e., adding 3% CaCl$_2$ aqueous solution, stirring, filtered off and washing with water), followed by drying at 120° C. for 2 hours. | 3.5 |

In order to examine the performance of each sample as a stabilizer, it was added together with other stabilizers and lubricants to a vinyl chloride resin (degree of polymerization: 1,500; Zeon 103EP, produced by Nippon Zeon Co., Ltd.) in the amounts as indicated in Table 2 per 100 parts by weight of the vinyl chloride resin to prepare a vinyl chloride resin composition. The vinyl chloride resin composition so obtained was evaluated by the following tests, and the results are shown in Table 2.

(1) STATIC HEAT STABILITY

The vinyl chloride resin composition was kneaded in a test roll (a mixing roll machine for laboratories NS-76, produced by Nishimura Kohki Kabushiki Kaisha) at 160° C. for 5 minutes and formed into a 0.5 mm thick sheet. The sheet was cut to prepare a 2 cm×5 cm test piece. The test piece was placed in an oven maintained at 200° C., and by observing the change in heat-coloration with the lapse of time, the heat deterioration of the vinyl chloride resin composition was evaluated as follows:

| | |
|---|---|
| 0.0 | no coloration |
| 1.0 | slightly colored |
| 2.0 | light yellow |
| 3.0 | yellow |
| 4.0 | brown |
| 5.0 | black |

That is, as the heat deterioration increases, the value becomes larger.

Additionally, the coloration until 20 minutes in the oven was evaluated as an initial coloration resistance. When the test piece was not colored, it was evaluated as having a good initial coloration resistance.

(2) DYNAMIC HEAT STABILITY

The vinyl chloride resin composition was continuously kneaded for 60 minutes in a test roll maintained at 190° C. During the period, it was taken out in the form of a sheet every ten minutes and the degree of coloration was evaluated by the same evaluation system as in (1).

(3) RESISTANCE TO ACCUMULATED HEAT DISCOLORATION

The vinyl chloride resin composition was kneaded in a test roll at 160° C. for 5 minutes and formed into a 0.5 mm thick sheet. Two sheets were superposed and heat-pressed at 170° C. and 30 kg/cm$^2$ for 5 minutes to provide a test piece (thickness 1 mm). This test piece was placed in an oven maintained at 100° C. and allowed to stand therein for 48 hours. Thereafter, the degree of discoloration by heat was observed. When the degree of discoloration was low, it was evaluated as having a good resistance to accumulated heat discoloration.

(4) WEATHER RESISTANCE

(i) Outdoor Weathering Test

The test piece (thickness 1 mm) was exposed to outdoor atmospheric conditions (including sunlight and rain) for 6 months, and by observing the degree of discoloration of the test piece, the weather resistance of the vinyl chloride resin composition was evaluated. When the degree of discoloration was low, it was evaluated as having a good weather resistance.

(ii) Irradiation with Lamp

The test piece was irradiated with ultraviolet rays for 24 hours by the use of a sterilization lamp, and by observing the degree of discoloration of the test piece, the light resistance was evaluated. When the discoloration was low, it was evaluated as having a good light resistance.

(5) BLOOMING RESISTANCE

The test piece was soaked in a hot water at 70° C. for 24 hours and dried with air, and by observing the white blooming state of the surface of the test piece, the blooming resistance was evaluated. When the degree of the whitening was low, it was evaluated as having a good blooming resistance.

(6) PLATE-OUT RESISTANCE 1.0 part by weight of Watching Red was added to each vinyl chloride resin composition, and the resulting mixture was kneaded for 10 minutes in a test roll at 160° C. and formed into a sheet. Thereafter, without cleaning the surface of the roll, a vinyl chloride resin composition having the clean-up formulation as shown below was placed and kneaded in the test roll for 5 minutes under the same conditions as above and formed into a sheet. From the degree of red coloration owing to the residual attachments on the surface of the roll, the plate-out resistance was evaluated. When the degree of red coloration was low, it was evaluated as having a good plate-out resistance.

| Clean-up Formulation | parts by weight |
|---|---|
| Vinyl Chloride Resin (Zeon 103EP) | 100 |
| Dioctyl Phthalate | 40 |
| Calcium Carbonate | 10 |
| Titanium Dioxide | 1 |
| Cd—Ba Based Composite Metal Soap | 1 |

TABLE 2

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| Composition (phr) | | | | | | | | | | |
| Zeolite | | | | | | | | | | |
| Sample No. 1-1 (Na$_2$O, 17.0%) | — | — | — | — | 1 | — | 1 | — | — | — |
| Sample No. 1-2 (Na$_2$O, 12.3%) | — | — | — | — | — | 1 | — | 1 | — | — |
| Sample No. 1-3 (Na$_2$O, 8.2%) | 1 | — | 1 | — | — | — | — | — | — | — |
| Sample No. 1-4 (Na$_2$O, 3.5%) | — | 1 | — | 1 | — | — | — | — | — | — |
| Tribasic Lead Sulfate | 2 | 2 | — | — | 2 | 2 | — | — | 2.5 | — |
| Lead Stearate | 1 | 1 | — | — | 1 | 1 | — | — | 1.5 | — |
| Octyltin Mercaptide | — | — | 1 | 1 | — | — | 1 | 1 | — | 1 |
| Calcium Stearate | 1 | 1 | — | — | 1 | 1 | — | — | 1 | — |
| Stearyl Alcohol | — | — | 1 | 1 | — | — | 1 | 1 | — | 1 |
| Static Heat Stability | | | | | | | | | | |
| Exposure Time in an Oven at 200° C. (minutes) | | | | | | | | | | |
| 0 | 0.0 | 0.0 | 0.0 | 0.0 | 0.0 | 0.0 | 0.0 | 0.0 | 0.0 | 0.0 |
| 10 | 1.0 | 1.0 | 0.0 | 0.0 | 1.0 | 1.0 | 1.0 | 1.0 | 2.0 | 1.0 |
| 20 | 1.0 | 1.0 | 1.0 | 1.0 | 3.0 | 2.0 | 2.0 | 2.0 | 2.0 | 2.0 |
| 30 | 2.0 | 1.0 | 2.0 | 1.0 | 3.0 | 3.0 | 3.0 | 3.0 | 2.0 | 2.0 |
| 40 | 3.0 | 2.0 | 3.0 | 2.0 | 4.0 | 4.0 | 4.0 | 3.0 | 4.0 | 3.0 |
| 60 | 4.0 | 3.0 | 4.0 | 3.0 | 5.0 | 4.0 | 5.0 | 4.0 | 5.0 | 4.0 |
| Initial Coloration Resistance | A | A | A | A | C | B | B | B | C | B |
| Dynamic Heat Stability | | | | | | | | | | |
| Kneading Time in Test Roll at 190° C. (minutes) | | | | | | | | | | |
| 10 | 0.0 | 0.0 | 0.0 | 0.0 | 1.0 | 1.0 | 1.0 | 1.0 | 1.0 | 1.0 |
| 20 | 1.0 | 1.0 | 1.0 | 1.0 | 2.0 | 1.0 | 2.0 | 1.0 | 2.0 | 1.0 |
| 30 | 2.0 | 1.0 | 2.0 | 1.0 | 2.0 | 2.0 | 2.0 | 2.0 | 2.0 | 2.0 |
| 40 | 2.0 | 2.0 | 2.0 | 1.0 | 4.0 | 3.0 | 3.0 | 2.0 | 3.0 | 2.0 |
| 60 | 3.0 | 3.0 | 3.0 | 2.0 | 4.0 | 3.0 | 4.0 | 4.0 | 4.0 | 3.0 |
| Resistance to Accumulated-Heat Discoloration | B | B | B | B | C | B | C | B | C | B |
| Weather Resistance | | | | | | | | | | |
| Outdoor Weathering for 6 Months | B | B | B | B | D | C | D | C | C | B |
| Irradiation by use of Sterilization Lamp for 24 Hours | B | B | B | B | D | C | D | C | B | B |
| Plate-Out Resistance | B | B | B | B | B | B | B | B | C | C |
| Blooming Resistance | B | B | B | B | B | B | B | B | C | C |

Note
A: Very Good,
B: Good,
C: Fair,
D: Poor

From the results shown in Table 2, it can be seen that calcium-substituted zeolites A having low residual sodium contents (Sample Nos. 1-3 and 1-4), when used in combination with the lead- or organic tin-based stabilizers (Examples 1 to 4), markedly contribute to improvements in the initial coloration resistance, resistance to accumulated-heat discoloration, plate-out resistance and blooming resistance, and in respect of the weather resistance, provide better results as compared to the case using the conventional lead- or organic tin-based stabilizer alone.

On the other hand, in the case of calcium-substituted zeolites A having a residual sodium content as Na₂O exceeding 10% (Sample Nos. 1-1 and 1-2), no preferred results are obtained, in particular, in respect of the weather resistance (Comparative Examples 1 to 4).

EXAMPLES 5-12

In this example, various types of calcium-substituted crystalline aluminosilicates were prepared and examined in their performances as a stabilizer. The preparation method and residual sodium content of each sample are indicated in Table 3.

TABLE 3

| Sample No. | Type | Preparation Method | Na₂O (%) |
|---|---|---|---|
| 2-1 | Calcium-substituted zeolite A dehydrated product | The calcium-substituted zeolite A crystal powder (Sample 1-4) was dehydrated by heating at 400° C. for 2 hours to reduce the water content* to 3.5%. | 3.7 |
| 2-2 | Calcium-substituted zeolite X | To a crystal powder of Molecular Sieves 13X (produced by Union Carbide Co.) was added a 3 wt % CaCl₂ aqueous solution containing calcium ions in an amount of two times the equivalents necessary for total exchange with sodium ion. The resulting mixture was stirred for 5 hours, filtered off, washed with water, and then dried at 120° C. | 4.5 |
| 2-3 | Calcium-substituted zeolite Y | A crystal powder of Molecular Sieves SK-40 (produced by Union Carbide Co.) was subjected to the same procedure as used to obtain Sample 2-2. | 3.4 |
| 2-4 | Calcium-substituted hydroxy sodalite | In accordance with the method as described in J. Chem. Soc., 6.8 page 1561 (1952), sodium hydroxy sodalite crystals were prepared by crystallizing sodium aluminosilicate gel in the presence of an excess of sodium hydroxide and they were subjected to the same procedure as used to prepare Sample 2-2. | |

*Note:

Water content = $\frac{W_2 - W_1}{W_1} \times 100$, wherein $W_2$ is a weight of the zeolite after heated at 400° C. for 2 hours and $W_1$ is a weight of the zeolite after heated at 800° C. for 2 hours.

In order to examine the performance as a stabilizer of samples as shown in Table 3, it was added together with other stabilizers and lubricants to a vinyl chloride resin (Zeon 103EP) in the amounts as shown in Table 4 per 100 parts by weight of the vinyl chloride resin to prepare a vinyl chloride resin composition. The vinyl chloride resin composition thus obtained was evaluated by the same methods as in Examples 1-4. The results are shown in Table 4.

From the results shown in Table 4, it can be seen that all of the calcium-substituted crystalline aluminosilicates exhibit effects similar to those of calcium-substituted zeolites A (Examples 1-4).

TABLE 4

| | Example | | | | | | | |
|---|---|---|---|---|---|---|---|---|
| | 5 | 6 | 7 | 8 | 9 | 10 | 11 | 12 |
| Composition (phr) | | | | | | | | |
| Aluminosilicate | | | | | | | | |
| Sample No. 2-1 (calcium-substituted zeolite A dehydrated product) | 1 | — | — | — | 1 | — | — | — |
| Sample No. 2-2 (calcium-substituted zeolite X) | — | 1 | — | — | — | 1 | — | — |
| Sample No. 2-3 (calcium-substituted zeolite Y) | — | — | 1 | — | — | — | 1 | — |
| Sample No. 2-4 (calcium-substituted hydroxy sodalite) | — | — | — | 1 | — | — | — | 1 |
| Tribasic Lead Sulfate | 2 | 2 | 2 | 2 | — | — | — | — |
| Lead Stearate | 1 | 1 | 1 | 1 | — | — | — | — |
| Octyltin Mercaptide | — | — | — | — | 1 | 1 | 1 | 1 |
| Calcium Stearate | 1 | 1 | 1 | 1 | — | — | — | — |
| Stearyl Alcohol | — | — | — | — | 1 | 1 | 1 | 1 |
| Static Heat Stability | | | | | | | | |
| Exposure Time in an Oven at 200° C. (minutes) | | | | | | | | |
| 0 | 0.0 | 0.0 | 0.0 | 0.0 | 0.0 | 0.0 | 0.0 | 0.0 |
| 10 | 1.0 | 1.0 | 1.0 | 1.0 | 0.0 | 1.0 | 1.0 | 1.0 |
| 20 | 1.0 | 1.0 | 1.0 | 2.0 | 1.0 | 1.0 | 1.0 | 2.0 |
| 30 | 1.0 | 2.0 | 2.0 | 3.0 | 1.0 | 2.0 | 2.0 | 2.0 |
| 40 | 2.0 | 2.0 | 3.0 | 3.0 | 2.0 | 3.0 | 3.0 | 3.0 |
| 60 | 3.0 | 3.0 | 3.0 | 4.0 | 3.0 | 3.0 | 4.0 | 4.0 |
| Initial Coloration Resistance | A | A | A | B | A | A | A | B |
| Dynamic Heat Stability | | | | | | | | |
| Kneading Time in Test Roll at 190° C. (minutes) | | | | | | | | |
| 10 | 0.0 | 0.0 | 0.0 | 1.0 | 0.0 | 0.0 | 0.0 | 0.0 |
| 20 | 1.0 | 1.0 | 1.0 | 1.0 | 1.0 | 1.0 | 1.0 | 1.0 |
| 30 | 1.0 | 2.0 | 2.0 | 2.0 | 1.0 | 1.0 | 2.0 | 2.0 |
| 40 | 2.0 | 2.0 | 3.0 | 3.0 | 1.0 | 2.0 | 3.0 | 3.0 |
| 60 | 3.0 | 3.0 | 3.0 | 4.0 | 2.0 | 2.0 | 3.0 | 4.0 |
| Resistance to Accumulated-Heat Discoloration | B | B | B | B | B | B | B | B |
| Weather Resistance | | | | | | | | |
| Outdoor Exposure for 6 Months | B | B | B | B | B | B | B | B |
| Irradiation by Use of Sterilization Lamp for 24 Hours | B | B | B | C | B | B | B | C |
| Plate-Out Resistance | B | B | B | B | B | B | B | B |
| Blooming Resistance | B | B | B | B | B | B | B | B |

EXAMPLES 13-19

In these examples, various metal-substituted zeolite A stabilizers were prepared and measured in their performances as stabilizers. The preparation method and residual sodium content of each sample are shown in Table 5.

TABLE 5

| Sample No. | Type | Preparation Method | Na$_2$O (%) |
|---|---|---|---|
| 3-1 | Magnesium-substituted zeolite A | To the sodium zealite A crystal powder, Sample 1-1, was added an Mg(NO$_3$)$_2$ aqueous solution containing magnesium ions in an amount equivalent for exchange with the sodium ions. The mixture was stirred at room temperature for 5 hours, filtered off, washed with water, and then dried at 120° C. | 5.3 |
| 3-2 | Strontium-substituted zeolite A | The same procedure as used in obtaining Sample 3-1 was followed, except that an SrCl$_2$ aqueous solution was used in place of the Mg(NO$_3$)$_2$. | 4.7 |
| 3-3 | Lead-substituted zeolite A | The same procedure as used in obtaining Sample 3-1 was followed, except that a Pb(NO$_3$)$_2$ aqueous solution was used in place of the Mg(NO$_3$)$_2$ aqueous solution. | 3.9 |
| 3-4 | Zinc-substituted zeolite A | The same procedure as used in obtaining Sample 3-1 was followed, except that a ZnSO$_4$ aqueous solution was used in place of the Mg(NO$_3$)$_2$ aqueous solution. | 4.9 |

In order to examine the performance as a stabilizer of the samples in Table 5, they were added together with other stabilizers and lubricants to a vinyl chloride resin (Zeon 103EP) in the amount as shown in Table 6 per 100 parts by weight of the vinyl chloride resin to prepare a vinyl chloride resin composition. The vinyl chloride resin compositions thus obtained were evaluated by the same methods as in Examples 1-4. The results are shown in Table 6.

From the results shown in Table 6, it can be seen that all of the various metal-substituted zeolites A exhibit performance similar to those of the calcium-substituted zeolites A.

TABLE 6

| | Example | | | | | | |
|---|---|---|---|---|---|---|---|
| | 13 | 14 | 15 | 16 | 17 | 18 | 19 |
| Composition (phr) | | | | | | | |
| Zeolite | | | | | | | |
| Sample No. 3-1 (magnesium) | 1 | — | — | 1 | — | — | — |
| Sample No. 3-2 (strontium) | — | 1 | — | — | 1 | — | — |
| Sample No. 3-3 (lead) | — | — | 1 | — | — | 1 | — |
| Sample No. 3-4 (zinc) | — | — | — | — | — | — | 1 |
| Tribasic Lead Sulfate | 2 | 2 | 2 | — | — | — | — |
| Lead Stearate | 1 | 1 | 1 | — | — | — | — |
| Octyltin Mercaptide | — | — | — | 1 | 1 | 1 | 1 |
| Calcium Stearate | 1 | 1 | 1 | — | — | — | — |
| Stearyl Alcohol | — | — | — | 1 | 1 | 1 | 1 |
| Static Heat Stability | | | | | | | |
| Exposure Time in Oven at 200° C. (minutes) | | | | | | | |
| 0 | 0.0 | 0.0 | 0.0 | 0.0 | 0.0 | 0.0 | 0.0 |
| 10 | 0.0 | 0.0 | 0.0 | 0.0 | 0.0 | 0.0 | 0.0 |
| 20 | 1.0 | 2.0 | 2.0 | 1.0 | 1.0 | 1.0 | 0.0 |
| 30 | 1.0 | 2.0 | 2.0 | 1.0 | 2.0 | 1.0 | 1.0 |
| 40 | 2.0 | 2.0 | 2.0 | 2.0 | 2.0 | 2.0 | 2.0 |
| 60 | 3.0 | 3.0 | 3.0 | 3.0 | 3.0 | 3.0 | 4.0 |
| Initial Coloration Resistance | A | B | B | A | A | A | A |
| Dynamic Heat Stability | | | | | | | |
| Kneading Time in Test Roll at 190° C. (minutes) | | | | | | | |
| 10 | 0.0 | 0.0 | 0.0 | 0.0 | 0.0 | 0.0 | 0.0 |
| 20 | 1.0 | 1.0 | 1.0 | 1.0 | 1.0 | 1.0 | 1.0 |
| 30 | 1.0 | 2.0 | 1.0 | 1.0 | 2.0 | 2.0 | 1.0 |
| 40 | 2.0 | 2.0 | 2.0 | 1.0 | 2.0 | 2.0 | 2.0 |
| 60 | 3.0 | 3.0 | 3.0 | 2.0 | 3.0 | 3.0 | 4.0 |
| Resistance to Accumulated-Heat Discoloration | B | B | B | B | B | B | B |
| Weather Resistance | | | | | | | |
| Outdoor Exposure | B | B | B | B | B | B | B |
| Irradiation by Use of Sterilization Lamp | B | B | B | B | B | B | B |
| Plate-Out Resistance | B | B | B | B | B | B | B |
| Blooming Resistance | B | B | B | B | B | B | B |

EXAMPLES 20-52 AND COMPARATIVE EXAMPLES 7-19

| Basic Formulation | parts by weight |
|---|---|
| Vinyl Chloride Resin (degree of of polymerization: 1,050) | 100 |
| Dioctyl Phthalate | 50 |
| Epoxidized Soybean Oil (ESBO) | 3 |
| Stearic Acid | 1 |

To the above basic formulation was added 3 phr of each of the metal-substituted crystalline zeolites as shown in Table 7 in combination with 1 phr of ethylene glycol as a clarifier to prepare a vinyl chloride resin composition. Additionally, control compositions were prepared by using an unsubstituted sodium zeolite in place of the metal-substituted zeolite and by adding no clarifier.

The vinyl chloride resin composition was molded at 160° C. for 3 minutes by use of a calender roll in a thickness of 0.5 mm, pre-heated at 170° C. for 3 minutes and press-molded at 170° C. and 150 kg/cm$^2$ for 5 minutes to obtain a sheet-like resin composition. This sheet-like resin composition as used as a test piece and its transparency was measured as follows:

MEASUREMENT OF TRANSPARENCY

With light of a wavelength of 500 nm from a spectral photometer (Hitachi 101), the transmittance of the test piece was measured (with the transmittance of water in a 1 cm glass cell being taken as 100%).

The results are shown in Table 7. From the results, it can be seen that the transparency of the resulting resin composition markedly increases when the metal-substituted zeolite of this invention is used with an organic straight-chained compound selected from an alcohol, an aldehyde, a carboxylic acid, a ketone, an ester and an ether.

TABLE 7

| Run No. | Crystalline Zeolite (3 phr) | Organic Compound Added (1 phr) | Transmittance (%) |
|---|---|---|---|
| Comparative Example 7 | — | — | 95.0 |
| Comparative Example 8 | Na—Zeolite A | — | 30.5 |
| Comparative Example 9 | Mg—Zeolite A | — | 29.8 |
| Comparative | | | |

TABLE 7-continued

| Run No. | Crystalline Zeolite (3 phr) | Organic Compound Added (1 phr) | Transmittance (%) |
|---|---|---|---|
| Comparative Example 10 | Ca—Zeolite A | — | 31.4 |
| Comparative Example 11 | Cd—Zeolite A | — | 27.5 |
| Comparative Example 12 | Zn—Zeolite A | — | 40.8 |
| Comparative Example 13 | Ca—Sodalite | — | 65.8 |
| Comparative Example 14 | Zn—Sodalite | — | 66.9 |
| Comparative Example 15 | Zn—Analsite | — | 20.2 |
| Comparative Example 16 | Zn—Crynoptilolite | — | 21.8 |
| Comparative Example 17 | Zn—Zeolite 13X | — | 40.0 |
| Comparative Example 18 | Zn—Zeolite Y | — | 37.5 |
| Example 19 | Na—Zeolite A | Ethylene Glycol | 41.5 |
| Example 20 | Mg—Zeolite A | Ethylene Glycol | 87.7 |
| Example 21 | Ca—Zeolite A | " | 87.9 |
| Example 22 | Cd—Zeolite A | " | 79.0 |
| Example 23 | Zn—Zeolite A | " | 91.3 |
| Example 24 | Ca—Sodalite | " | 73.5 |
| Example 25 | Zn—Sodalite | " | 77.1 |
| Example 26 | Zn—Analsite | " | 40.6 |
| Example 27 | Zn—Crynoptilolite | " | 57.2 |
| Example 28 | Zn—Zeolite 13X | " | 78.2 |
| Example 29 | Zn—Zeolite Y | " | 82.0 |
| Example 30 | Zn—Zeolite A | Acetic Acid | 54.1 |
| Example 31 | " | Propionic Acid | 75.2 |
| Example 32 | " | Butyric Acid | 59.0 |
| Example 33 | " | Acrylic Acid | 56.2 |
| Example 34 | " | Acetylacetone | 50.8 |
| Example 35 | " | 1,2-Dimethoxyethane | 55.0 |
| Example 36 | Zn—Zeolite A | Acetomethyl Acetate | 49.2 |
| Example 37 | " | Epichlorohydrin | 75.7 |
| Example 38 | " | Methyl Alcohol | 47.7 |
| Example 39 | " | Ethyl Alcohol | 53.2 |
| Example 40 | " | n-Propyl Alcohol | 69.0 |
| Example 41 | " | n-Butyl Alcohol | 74.7 |
| Example 42 | " | n-Amyl Alcohol | 50.3 |
| Example 43 | " | n-Hexyl Alcohol | 37.2 |
| Example 44 | " | Allyl Alcohol | 72.5 |
| Example 45 | " | Diethylene Glycol | 88.0 |
| Example 46 | " | Triethylene Glycol | 75.2 |
| Example 47 | " | Glycerin | 92.5 |
| Example 48 | " | Ethylene Glycol Monomethyl Ether | 87.5 |
| Example 49 | " | Ethylene Glycol Monoethyl Ether | 90.2 |
| Example 50 | " | Diethylene Glycol Monomethyl Ether | 91.8 |
| Example 51 | " | Diethylene Glycol Monoethyl Ether | 93.5 |
| Example 52 | " | Diethylene Glycol Mono-n-butyl Ether | 82.5 |

EXAMPLES 53–62 AND COMPARATIVE EXAMPLE 20

In connection with ethylene glycol and glycerin which were found (from the results shown in Table 7) to be most effective to increase the transparency, the relation between the amount of the addition and the transparency or heat stability was examined using a composition having the following basic formulation.

| Basic Formulation | parts by weight |
|---|---|
| Vinyl Chloride Resin | 100 |
| Dioctyl Phthalate | 50 |
| Epoxidized Soybean Oil | 3 |
| Stearic Acid | 1 |
| Zinc-Substituted Zeolite A | 3 |
| Ethylene Glycol or Glycerin | Predetermined Amount |

The production of the test piece and the measurement of the transmittance in order to examine the transparency were carried out in the same manner as in Examples 4–52. For the heat stability testing, a sheet was treated at 160° C. for 3 minutes with a calender roll and cut to provide a test piece of 30 mm × 40 mm × 0.3 mm. This test piece was placed in an oven at 170° C. to examine the change with time of the degree of coloration. The results are shown in Table 8.

TABLE 8

| No. | Amount of Ethylene Glycol or Glycerin Added (phr) | | 500 nm Transmittance (%) | Degree of Coloration by Oven Testing at 170° C.* | | | | | |
|---|---|---|---|---|---|---|---|---|---|
| | | | | 0 (min) | 10 (min) | 20 (min) | 40 (min) | 60 (min) | 80 (min) |
| Comparative Example 20 | — | — | 40.8 | 0.0 | 0.0 | 0.0 | 0.1 | 0.2 | 0.5 |
| Example 53 | Ethylene Glycol | 0.05 | 70.3 | 0.0 | 0.0 | 0.0 | 0.0 | 0.1 | 1.0 |
| Example 54 | Ethylene Glycol | 0.1 | 82.0 | 0.0 | 0.0 | 0.0 | 0.0 | 0.1 | 1.5 |
| Example 55 | Ethylene Glycol | 0.3 | 90.5 | 0.0 | 0.0 | 0.0 | 0.0 | 0.1 | 1.0 |
| Example 56 | Ethylene Glycol | 0.5 | 92.5 | 0.0 | 0.0 | 0.0 | 0.0 | 0.1 | 1.0 |
| Example 57 | Ethylene Glycol | 1.0 | 91.3 | 0.0 | 0.0 | 0.0 | 0.0 | 0.1 | 1.0 |
| Example 58 | Glycerin | 0.05 | 71.4 | 0.0 | 0.0 | 0.0 | 0.0 | 0.0 | 1.0 |
| Example 59 | " | 0.1 | 86.6 | 0.0 | 0.0 | 0.0 | 0.0 | 0.1 | 1.0 |
| Example 60 | " | 0.3 | 91.2 | 0.0 | 0.0 | 0.0 | 0.0 | 0.1 | 1.5 |

TABLE 8-continued

| No. | Amount of Ethylene Glycol or Glycerin Added (phr) | | 500 nm Transmittance (%) | Degree of Coloration by Oven Testing at 170° C.* | | | | | |
|---|---|---|---|---|---|---|---|---|---|
| | | | | 0 (min) | 10 (min) | 20 (min) | 40 (min) | 60 (min) | 80 (min) |
| Example 61 | '' | 0.5 | 92.0 | 0.0 | 0.0 | 0.0 | 0.0 | 0.1 | 2.0 |
| Example 62 | '' | 1.0 | 90.5 | 0.0 | 0.0 | 0.0 | 0.1 | 0.2 | 1.5 |

*The change with time of the degree of coloration was evaluated as follows:
0.0 not colored;
1.0 slightly colored;
2.0 light yellow;
3.0 yellow;
4.0 brown;
5.0 black While the invention has been described in detail and with reference to specific embodiments thereof, it will be apparent to one skilled in the art that various changes and modifications can be made therein without departing from the spirit and scope thereof.

What is claimed is:

1. A stabilizer for a halogen-containing resin which comprises zeolite A wherein the water content is about 8% by weight or less substituted with ions of a metallic element belonging to Group II except for zinc or Group IVA of the Periodic Table for Group I (M) metal ion contained in said zeolite A and containing 10% by weight or less, as $M_2O$, of residual Group I metal ions.

2. A stabilizer as in claim 1 wherein the metallic element of Group II of the Periodic Table is at least one member selected from the group consisting of magnesium, calcium, strontium, barium, and cadmium.

3. A stabilizer as in claim 1 wherein the metallic element of Group IVA of the Periodic Table is tin or lead.

4. A stabilizer as in claim 2 wherein the metallic element is magnesium.

5. A stabilizer as in claim 1 comprising the metal-substituted zeolite A used in combination with a lead-based stabilizer.

6. A stabilizer as in claim 1 comprising the metal-substituted zeolite A used in combination with an organic tin-based stabilizer.

7. A stabilizer as in claim 5 or 6 wherein the metal-substituted zeolite A is a calcium-substituted zeolite A.

8. A stabilizer as in claim 1 containing 5% by weight or less, as $M_2O$, of residual Group I metal ions.

9. A stabilizer as in claim 1 wherein the water content is 5% by weight or less.

10. A stabilizer as in claim 1 comprising the metal-substituted zeolite A used in combination with an epoxy compound, a polyvalent alcohol, or a partial ester thereof.

11. A stabilized halogen-containing resin composition comprising a halogen-containing resin and a stabilizer which is a zeolite A substituted with ions of a metallic element belonging to Group II except for zinc or Group IVA of the Periodic Table for Group I (M) metal ion contained in said aluminosilicate and containing 10% by weight or less, as $M_2O$, of residual Group I metal ions.

12. A stabilized halogen containing resin composition as in claim 11 wherein the metallic element of Group II of the Periodic Table is at least one member selected from the group consisting of magnesium, calcium, strontium, barium, and cadmium.

13. A stabilized halogen-containing resin composition as in claim 11 wherein the metallic element of Group IVA of the Periodic Table is tin or lead.

14. A stabilized halogen-containing resin composition as in claim 12 wherein the metallic element is magnesium.

15. A stabilized halogen-containing resin composition as in claim 11, wherein the stabilizer comprises the metal-substituted zeolite A used in combination with a lead-based stabilizer.

16. A stabilized halogen-containing resin composition as in claim 11 wherein the stabilizer comprises the metal-substituted zeolite A used in combination with an organic tin-based stabilizer.

17. A stabilized halogen-containing resin composition as in claim 15 or 16 wherein the metal-substituted zeolite A is a calcium-substituted zeolite A.

* * * * *